May 22, 1934.	W. IVERSON	1,959,533
HYDRAULIC CLUTCH
Filed Aug. 5, 1932	2 Sheets-Sheet 1
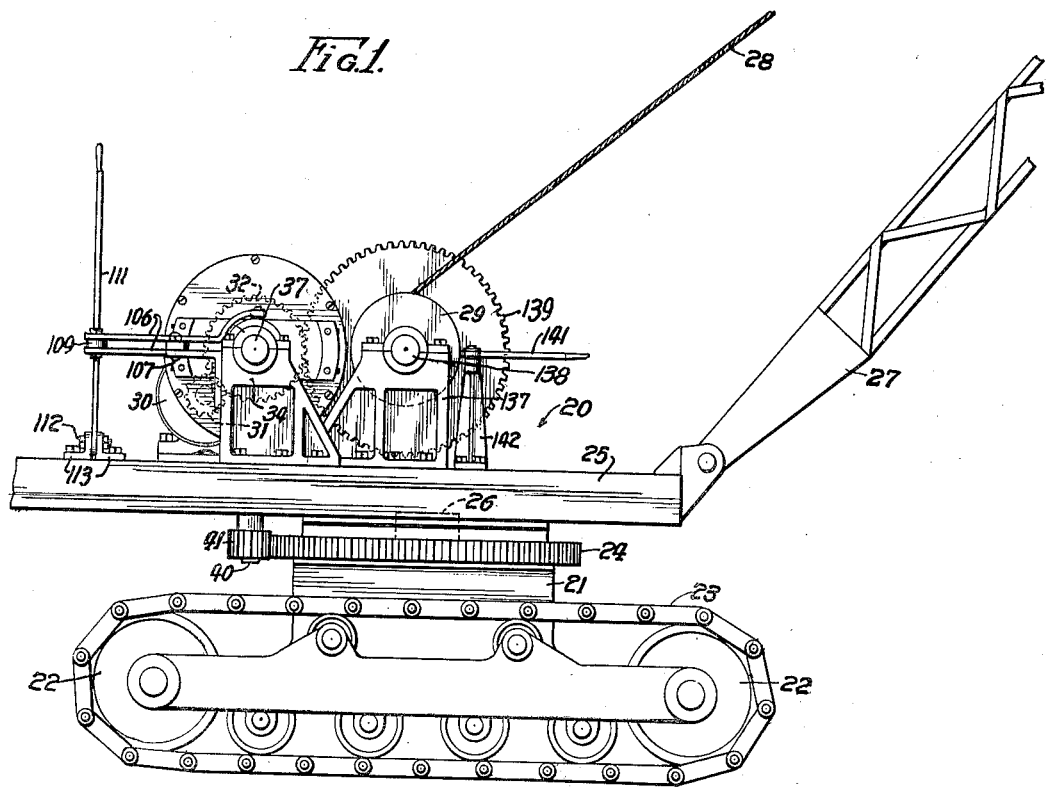
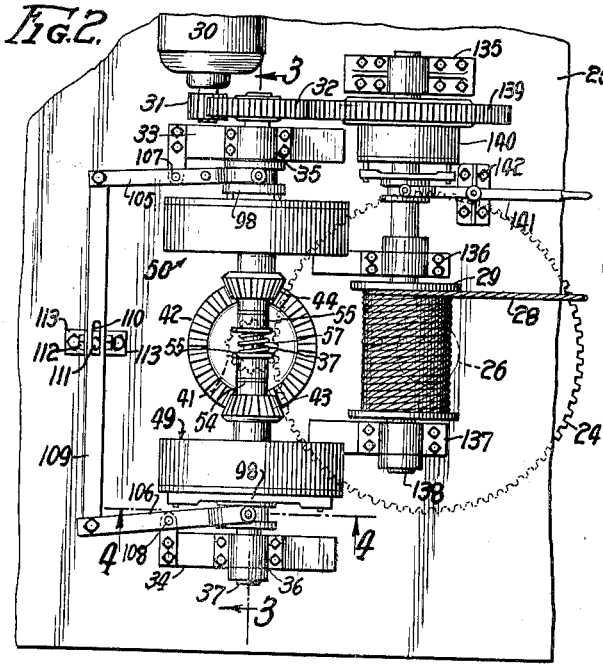
Inventor:
William Iverson,
By: Williams, Bradbury,
McCaleb & Hinkle
Attys.

May 22, 1934.  W. IVERSON  1,959,533
HYDRAULIC CLUTCH
Filed Aug. 5, 1932   2 Sheets-Sheet 2
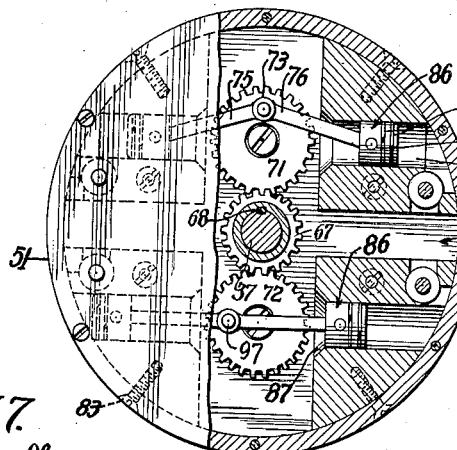
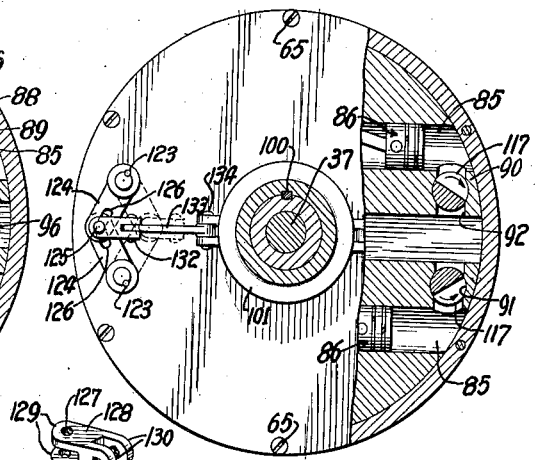
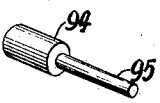
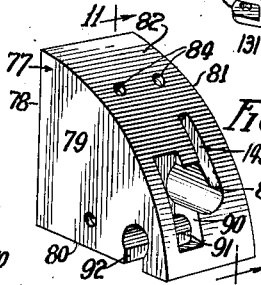
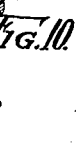
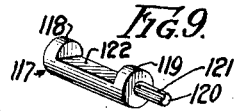
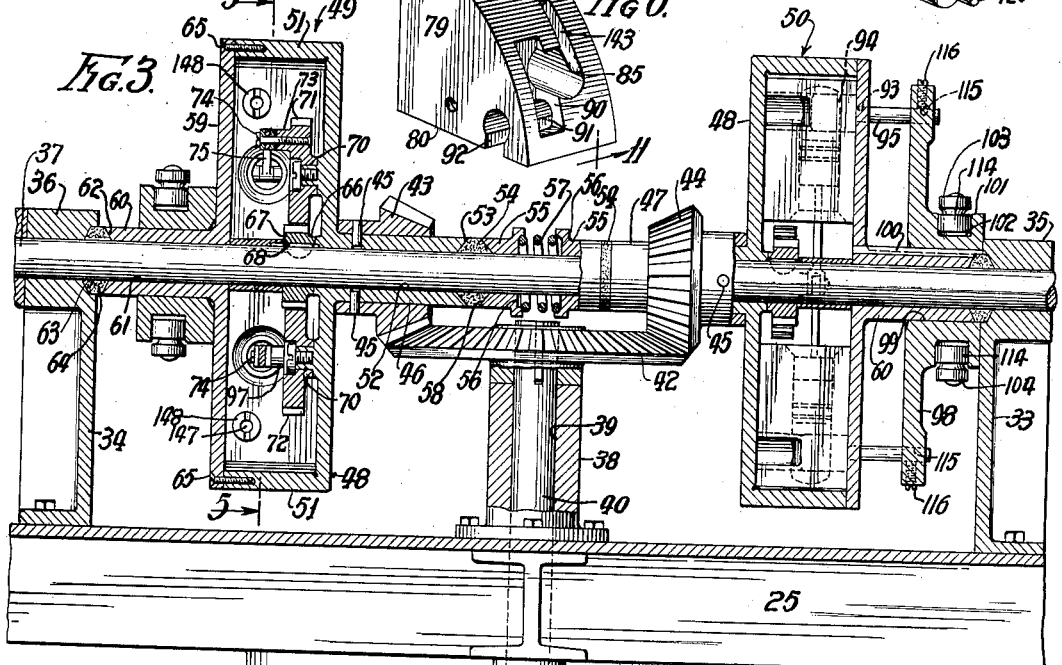
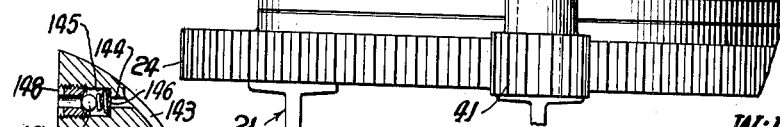
Inventor:
William Iverson,
By Williams, Bradbury,
McCaleb & Hinkle
Attys.

Patented May 22, 1934

1,959,533

UNITED STATES PATENT OFFICE 1,959,533

HYDRAULIC CLUTCH

William Iverson, Chicago, Ill.

Application August 5, 1932, Serial No. 627,556

3 Claims. (Cl. 74—34)

The present invention relates to hydraulic clutches, and is particularly concerned with the provision of clutches of the type adapted to be used for varying the speed of one or more driven members.

Clutches of the present type are of particular advantage when used in connection with hoists or cranes of large capacity. I desire it to be understood, however, that my clutch is capable of general application, and I do not wish to be limited to any particular use, and the use selected is merely exemplary of one of the applications of the invention in which the structure is of the greatest advantage.

In the cranes of the prior art it is necessary in picking up a load to permit slippage between the clutch band which consists of a friction facing, and its cooperating part. It is necessary to use a brake for holding the load, and at the same time it is necessary to permit the brake to slip when the load is picked up. The friction resulting from such action causes excessive burning of the bands, and the result is that frequent adjustment and relining of the bands are necessary on account of the excessive wear and friction.

This is particularly true in the larger types of cranes and hoists where it becomes practically impossible to operate satisfactorily with the friction bands of the prior art because the heat generated cannot be satisfactorily dissipated.

One of the objects of the present invention is the provision of an improved clutch which is adapted to permit the picking up of a load by a hoist or the slowing down of the driven mechanism without necessity for excessive wear and/or friction.

Another object of the invention is the provision of an improved hydraulic clutch which is adapted to eliminate the wear and friction present in the clutches of the prior art and to be operated continuously at a wide range of speeds without necessity for readjustment or replacement of any of its parts.

Another object of the invention is the provision of a hydraulic clutch of the type described which is adapted to be set so that the valve can hold the load without a brake and so that a very gradual pick-up may be provided without any of the disadvantages of the clutches of the prior art. A brake may be provided upon any mechanism equipped with the present clutch, but the brake is desirable only as an additional safety feature.

Another object of the invention is the provision of an improved hydraulic clutch which is adapted to provide a uniform and smooth pick-up or driving connection between the driving member and the driven member.

Other objects and advantages of the invention will be apparent from the following description and the accompanying drawings, in which similar characters of reference indicate similar parts throughout the several views.

Referring to the two sheets of drawings,

Fig. 1 is a diagrammatic side elevational view of a crane equipped with a hydraulic clutch constructed according to the present invention;

Fig. 2 is a fragmentary top plan view of the crane of Fig. 1;

Fig. 3 is a fragmentary vertical sectional view taken on the plane of the line 3—3 of Fig. 2, looking in the direction of the arrows, and showing the mechanism of a double clutch drive for rotating the turntable of the crane in either direction;

Fig. 4 is a side elevational view of the end of a hydraulic clutch, with the shaft in section, taken on the plane of the line 4—4 of Fig. 2, looking in the direction of the arrows;

Fig. 5 is an elevational view in partial section, taken on the plane of the line 5—5 of Fig. 3, showing the internal mechanism of the hydraulic clutch;

Fig. 6 is a view in perspective of one of the cylinder and valve blocks utilized in the structure of Fig. 5;

Fig. 7 is a view in perspective of a sliding or piston valve utilized in Fig. 5;

Fig. 8 is a modified construction in which a rotary valve is utilized;

Fig. 9 is a view in perspective of the rotary valve member of Fig. 8; and

Fig. 10 is a view in perspective of one of the links utilized in actuating the rotary valve of Fig. 9.

Fig. 11 is a sectional view of the cylinder block, showing the check valve arrangement.

Referring to Fig. 1, this is a diagrammatic illustration of a hoist 20 of the tractor type, which is provided with a supporting frame 21, having a plurality of wheels 22 for supporting a caterpillar tread 23. The tractor is provided with a fixed gear 24 carried by the frame, and with a turntable 25 rotatably mounted upon a vertically extending spindle 26. The turntable 25 carries the usual pivoted boom 27, which may be provided with the usual buckets or other conveying mechanism, adapted to be actuated by the cable 28 carried by drum 29.

I desire it to be understood that the present crane is merely exemplary of one of the modes of application of my invention, and the present clutch may be utilized for connecting or disconnecting the driven members from the driving members in any type of crane and for driving any type of mechanism.

For example, the turntable 25 may support a motor 30 which is provided with a pinion 31 for driving the spur gear 32. The turntable 25 fixedly supports the upwardly extending bearing frames 33, 34, which are provided with the bearings 35, 36 for rotatably supporting the shaft 37.

Turntable 25 is also provided with an appropriate bearing member 38 having a vertically extending cylindrical bore 39 for rotatably mounting the vertical shaft 40. Shaft 40 is provided with a pinion 41 fixedly secured thereto and located below the turntable 25 for engagement with the teeth of gear 24, which is carried by the frame 21.

Shaft 40 carries at its upper end a bevel gear 42, which is fixedly secured to the shaft and which engages the bevel pinions 43, 44, both of which rotate freely upon the shaft 27, but are fixedly secured by pins 45 to the sleeves 46, 47 of the clutch housings 48.

The crane is preferably provided with a pair of clutches 49, 50 for facilitating the drive of the shaft 40 in either direction so that the turntable 25 may be rotated in a clockwise or counterclockwise direction, looking from the top. Either one of the clutches may be utilized for holding the turntable in fixed position, but when one of the clutches is utilized to rotate the turntable in one direction, the other clutch is in inoperative position, or wide open.

Both the clutches 49, 50 may be identical in structure and operation, although they are reversed in action, and therefore it is only necessary to describe one of the clutches in detail.

Referring to Figures 3 to 7, the clutch 49 preferably consists of a substantially cylindrical casing 48 having a flat end and a cylindrical band 51. The flat end of the casing is provided with an axially located sleeve 46 which is provided with a cylindrical bore 52 for rotatably mounting the clutch housing on the shaft 27. Each of the sleeves 46, 47 is preferably provided with beveled or frusto-conical recesses 53 at their ends, adapted to receive the packing 54.

The shaft 27 also supports a pair of packing glands 55, each of which is provided with an annular recess 56 forming a seat for the compression spring 57 which urges the glands 55 into engagement with the packings 54. Each of the glands is likewise provided with a frusto-conical recess 58 for confining the packing 54 against the shaft. The packing 54 thus prevents leakage of oil or other hydraulic fluid from the clutch housings 48 along the shaft 27.

The clutch housing 48 is provided with a flat cover 59 which is also provided with an axially extending sleeve 60 having a bore 61 for receiving shaft 27. The end of sleeve 60 is beveled at 62, and the bearing 35 is provided with a beveled base annular recess 63 for receiving packing 64. The cover 59 may be secured to the housing 48 by a plurality of screw bolts 65 passing through the cover and threaded into the cylindrical wall 51, and a suitable gasket may be interposed between the cover 59 and housing 48, or the cover may be provided with a very close ground fit to prevent leakage of hydraulic fluid.

The clutch housing 48 is provided with a thrust bearing surface 66 surrounding shaft 27, and a pinion 67 is mounted inside housing 48 on shaft 27. Pinion 67 and shaft 27 are provided with suitable grooves for receiving a key 68, which causes the pinion 67 to rotate with the shaft, but permits a slight sliding movement between the pinion and the shaft. The sliding movement of the pinion 67 and housing 48 and associated mechanism on shaft 27 permits the same compression spring 57 to tighten all of the packings 64 at each end of each of the clutch housings, to maintain them in liquid-tight condition, taking up any wear.

A spacing sleeve 69 on shaft 27 inside casing 48 engages the end of pinion 67 and the inside of cover 59 and maintains the pinion 67 in proper position within the clutch housing. The clutch housing 48 is also provided with a pair of inwardly projecting lugs 70 having thrust bearing surfaces and cylindrical bearing surfaces to provide a rotatable support for the gears 71, 72 which engage the pinion 67. Screw bolts 73 secure the spur gears 71, 72 on their respective trunnions. Each of the spur gears is provided with a laterally projecting lug 73, providing a crank arm for connection by means of a screw bolt 74 to the connecting rods 75, 76.

As both of the gear arrangements are similar in construction at the bottom and top of Fig. 5, only one of them need be described in detail.

Referring to Fig. 6, this is a view in perspective of a cylinder and valve block which may consist of a metal member 77 having four flat sides 78—81 and a partially cylindrical side 82. The cylindrical part of the block 77 may be secured to the band 51 of the housing by screw bolts 83 which pass through the band 51 and are threaded into bores 84.

Each of the blocks 77 is provided with a transversely extending bore 85, forming a cylinder for the reception of the piston 86. The bore 85 may be suitably enlarged at 87 to provide clearance for operation of the crank 71. The piston 86 may consist of a substantially cylindrical member having suitable grooves for receiving the piston rings 88 and having a transverse bore for receiving the connecting rod pin 89. The cylinder is hollow to receive the connecting rod 76, and may be similar in shape to any of the ordinary pistons used in pumps and engines.

At one end the cylinder bore 85 communicates through a passage 90 with a transversely extending valve bore 91. The valve bore 91 extends out of the flat side 79 of the block 77, and is provided with a slot 92 communicating with the lower flat side 80. The cover 59 (right, Fig. 6) is provided with bores 93 which are axially located with respect to the valve bores 91, and in each of the valve bores 91 there is mounted a substantially cylindrical valve member 94 having an outwardly projecting stem 95 passing through the bore 93.

When the valve member 94 is in the position shown at the right of Fig. 3, the cylindrical bore 85 is in communication with the interior space 96 in the housing 46 between the blocks 77 through the slot 90, bore 91 and slot 92. When the valve 94 is moved to the left in Fig. 9, the opening in slot 90 communicating with bore 91 is throttled by the cylindrical valve member 94, and pressure is generated in the cylindrical bore 85, but when the valve 94 is wide open the corresponding piston may move back and forth with comparative freedom.

Referring to Fig. 5, it will be noted that the crank arm 73 of the upper gear 71 is located at ninety degrees from the crank arm 97 of the lower gear. This eliminates the possibility of a lack of resistance at dead center of either of these cranks and gives the clutch a uniform resistance at all times.

Referring to Figs. 2 and 3, the valves 94 may be actuated by an actuating plate 98 (Fig. 4) which extends across the end of the clutch housing 48 and is provided with a cylindrical bore 99 for passing the sleeve 60. Sleeve 60 and plate 98 may be provided with registering grooves for receiving the key 100 which causes the plate 98 to rotate with the sleeve 60 and clutch housing 48, but permits it to slide in an axial direction. The plate 98 is preferably provided with a collar 101 having an annular groove 102 for receiving the trunnions 103, 104 on a forked actuating lever 105. Two similar levers 105, 106 are pivoted on bolts 107, 108 carried by the frame members 33, 34. The ends of the levers 105, 106 are both connected to a cross-bar 109. Cross-bar 109 may be provided with a slot 110, through which passes the hand lever 111, the lower end of which is pivotally mounted on a bolt 112 carried by angle brackets 113 on the turntable 25.

If desired, the lugs or trunnions 103, 104 may rotatably support rollers 114 to reduce the friction at this point.

The operation of the double clutch arrangement is as follows: When the hand lever 111 is moved toward the right to the position shown in Fig. 2, the valves of the right hand clutch 50 are closed because the lever 106 pivots in a counterclockwise direction and moves the plate 98 with the valves 94 inward in Fig. 3. The valves 94 have their stems 95 disposed in transverse bores 115 located in the plate 98 and secured thereon by set screws 116. The valves of the clutch 51 are then opened by virtue of the opposite movement of the lever 105. The range of movement of the valves in both clutches is such that the valves of one clutch are completely opened before the valves of the other clutch begin to close, so that at the intermediate position of the hand lever 111 all of the valves may be opened.

Under these conditions the shaft 27, which may be running at constant speed, would drive the gears 67 and gears 71 and the pistons 86 would reciprocate freely in their bores, the liquid flowing in and out through the valve ports to and from the space 96 in the clutch housing 48.

When the hand lever is pushed to the right in Fig. 1 or 2, the valves of the right hand clutch begin to close and the valve openings leading to the cylinders of the right hand clutch are throttled.

This causes resistance to be transmitted by the pistons 86 to the gears 71 of that clutch, and the clutch housing then tends to rotate with the shaft 27.

It will thus be observed that the gear arrangement of the clutch is essentially a planetary gearing, which may either permit the gears to rotate freely with the housing standing still or the housing to rotate with the gears tending to stand still.

As the resistance is increased to the movement of the pistons 86 by the throttling valves, the housing 48 will tend to rotate faster, and by virtue of the valves the housings 48 may be caused to rotate at any speed up to the speed of the shaft 27. The housing is preferably filled with a suitable hydraulic fluid, such as oil, and consequently all parts of the mechanism in the housing are always immersed in oil and suitably lubricated.

When the right hand clutch 50 is closed the bevel gear 44 rotates with shaft 27 and drives the bevel gear 42, which transmits its movement through shaft 40 to pinion 41 and causes the turntable 25 to rotate upon its spindle 26 in one direction. When the opposite clutch 49 is in closed position, rotation of the turntable is produced in another direction. Necessarily when one bevel gear 44 is driving the bevel gear 42, the other gear 43 is driven backwards by the bevel gear 42, which rotates the corresponding clutch housing 48 in the opposite direction. This merely causes a rotation of the gears 71 on the pinion 67 of the shaft, but as the valves of that clutch are completely opened, the pistons 86 reciprocate freely and do not interpose any substantial resistance to this movement.

Referring to Figs. 8, 9 and 10, this is the modification in which rotary valves are used. The rotary valve member 117 is rotatably mounted in the bore 91. It is provided with bearing portions 118, 119 at each end and with a stem 120 having a slot 121.

The valve is cut away at 122 to provide a valve port, which is to provide communication between the slots 90 and the slots 92 when the valve is in the proper position. The slots have been given the corresponding numerals in Fig. 8, since the same form of valve and cylinder block may be used.

Each of the valve stems 120 may be fixedly secured by means of a key 123 to a link 124. Two of the links 124 are pivotally secured together by means of a pin 125 which passes through the slots 126. Pin 125 also passes through the bores 127 of a second link 128, which has a pair of flanges 129 located on each side of the links 124. The link 128 has another pair of flanges 130 located in planes at right angles to the flanges 129 and provided with bores 131 for receiving a transverse pin 132.

Pin 132 pivotally connects link 128 to another link 133, the other end of which is pivotally connected by pin 134 to a sliding collar 101. When the collar 101 slides in and out on shaft 27, in Fig. 8, the effective length of link 133 is shortened. This pushes link 128 inward or outward, as the case may be, and causes links 124 to rotate in opposite directions, opening or closing the rotary valves 117. For example, in Fig. 8, the valves are in closed position, the collar 101 having been moved in toward the limit of its position in engagement with the clutch housing. When the collar is moved away from the clutch housing, the upper valve would be rotated in a clockwise direction, and the lower valve in a counterclockwise direction, as shown by the arrows in Fig. 8, opening the valves. The operation of the complete mechanism embodying the rotary valves is otherwise exactly the same as that previously described.

Referring to Fig. 2, the turntable may support bearing brackets 135, 136, 137 for rotatably mounting the drum shaft 138. The drum 29 is fixedly mounted on the drum shaft and adapted to reel up the cable 28 or pay out the cable when a load is placed upon the cable 28 or boom 27. The shaft 138 may be provided with a gear 139, which rotates freely on the shaft, and is adapted to engage the drive gear 32, which is in turn driven by pinion 31 of motor 30.

A similar clutch housing 140 is rotatably mounted on shaft 138 and fixedly secured to gear 150

139. The clutch housing 140, of course, has its pinion 67 keyed to shaft 138, but the planetary gearing in the housing permits the housing and gear 139 to rotate freely on shaft 138 unless the valves are closed.

A similar hand lever 141 pivotally mounted on a bracket 142 controls the operation of a similar clutch collar. When the lever 141 is moved in a clockwise direction, the valves are closed and the valves are opened by a reverse movement.

By means of the clutch 140 the drum 29 may be driven at any time by the constantly rotating motor 30. The valves may be so adjusted by means of a lever 141 that while the motor rotates the drum is held in fixed position against the load which is then upon the drum. If the resistance of the hydraulic clutch is then reduced, the load upon the drum will cause the drum to pay out more cable, or if the resistance is increased the drum will be driven to reel up the cable.

If desired, auxiliary brakes may be provided in the form of bands engaging the drum or engaging brake drums carried thereby for holding the drum in any predetermined adjusted position.

Referring to Fig. 11, this is a sectional view of the cylinder block, showing a further improvement in the hydraulic brake, consisting in the addition of means for preventing the formation of a vacuum in the cylinder bore 85 when the outlet passages are throttled considerably. It was found that upon the suction stroke of the piston, when the valve bore 91 is throttled considerably, there was a tendency for the liquid to flow into the cylinder very slowly, which resulted in the formation of a vacuum in the cylinder at certain adjustments of the valve. This is particularly true when the piston is moving very fast.

In order to avoid such a tendency toward a vacuum, I prefer to provide the cylinder 85 with a check valve 147 which permits the inward flow of liquid from the housing, but prevents its backward flow upon a compression stroke of the piston.

For this purpose the block 77 may be provided with an additional bore 145 which is threaded at its outer end to receive a threaded sleeve 148 adapted to provide a seat for the check valve 147. Check valve 147 is illustrated as a ball which is pressed against its seat by a spring 146 seated against the bottom of the bore 145, but any form of check valve may be used, and in the larger installations flap check valves are preferably employed.

The bore 145 communicates with the cylinder 85 through bore 144 and slot 143, all of which are so arranged that they can be conveniently machined in the block 77. When the piston is moved to the left in Fig. 11, liquid flows in not only through the openings of the valve bore 91, but past the check valve 147, and the cylinder is filled with liquid at all times. When the piston moves to the right in Fig. 11, the check valve 147 closes, and the only ports permitting the outward flow of liquid are those of the valve bore 91 which are throttled by the valve and which interpose a predetermined resistance to the flow of the liquid.

It will thus be observed that the arrangement shown in Fig. 11 assures the filling of the cylinder with liquid at every stroke and prevents the formation of a vacuum which would render the piston ineffective. This action of the check valve is only required at the adjustments of the valve where the valve is nearly closed, but the check valve operates in the same manner at all times and permits the freer flow of the liquid when the valves are open.

It will thus be observed that I have provided an improved hydraulic clutch which is adapted to provide a variable speed connection between the driving member and a driven member, without interposing friction in the system, except the small amount of resistance caused by the flow of the hydraulic liquid in the hydraulic clutch.

The present hydraulic clutch is adapted to accomplish its functions for long periods of time without necessity for any readjustment or replacement of parts. This is a marked advantage over the friction facing or band clutches of the prior art in which the friction linings had to be frequently adjusted and replaced. The present clutch is capable of satisfactory operation on extremely large cranes where the band clutches of the prior art were not satisfactory. The present clutches may be used to control the connection of the motor to the turntable or the motor to the drum or any other part of the crane where a variable speed is desired at substantially the same power ratio.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a hydraulic clutch, the combination of a support provided with bearings, a driving shaft carried by said bearings, a driven shaft rotatably mounted on said support and having a bevel drive gear, a pair of clutch casings each provided with sleeves rotatably mounted on said driving shaft, said sleeves being provided with bevel pinions engaging said bevel gear, drive pinions located in each of said clutch casings and adapted to rotate with said driving shaft, planetary gears carried by each of said clutch casings and engaging said drive pinions, a plurality of segmentally shaped blocks located in said clutch casings and having cylinders formed therein, said cylinders communicating with the interior of said clutch casing through a valved port, pistons in said cylinders and connecting rods connecting said pistons in pairs to said planetary gears, and valves for controlling said valved ports whereby said driven shaft may be caused to rotate by said driving shaft at any of a multiplicity of different speeds and in either direction.

2. In a hydraulic clutch, the combination of a support provided with bearings, a driving shaft carried by said bearings, a driven shaft rotatably mounted on said support and having a bevel drive gear, a pair of clutch casings, each provided with sleeves rotatably mounted on said driving shaft, said sleeves being provided with bevel pinions engaging said bevel gear, drive pinions located in each of said clutch casings and adapted to rotate with said driving shaft, planetary gears carried by each of said clutch casings and engaging said drive pinions, a plurality of segmentally shaped blocks located in said clutch casings and having cylinders formed therein, said cylinders communicating with the interior of said clutch casing through a valved port, pistons in said cylinders and connecting rods connecting said pistons in pairs to said planetary gears, and valves for controlling said valved ports whereby said driven shaft may be caused to rotate by said driving shaft at any of a multiplicity of different speeds and in either direction, said valves comprising piston valves mounted for axial movement with respect to said driving shaft, a valve actuating plate slidably mounted on said driving shaft and rotatably mounted with said piston valves, and means slidably engaging said valve plate for simultaneously actuating the pistons of one clutch.

3. In a hydraulic clutch, the combination of a support provided with bearings, a driving shaft carried by said bearings, a driven shaft rotatably mounted on said support and having a bevel drive gear, a pair of clutch casings, each provided with sleeves rotatably mounted on said driving shaft, said sleeves being provided with bevel pinions engaging said bevel gear, drive pinions located in each of said clutch casings and adapted to rotate with said driving shaft, planetary gears carried by each of said clutch casings and engaging said drive pinions, a plurality of segmentally shaped blocks located in said clutch casings and having cylinders formed therein, said cylinders communicating with the interior of said clutch casing through a valved port, pistons in said cylinders and connecting rods connecting said pistons in pairs to said planetary gears, and valves for controlling said valved ports whereby said driven shaft may be caused to rotate by said driving shaft at any of a multiplicity of different speeds and in either direction, said valves comprising piston valves mounted for axial movement with respect to said driving shaft, a valve actuating plate slidably mounted on said driving shaft and rotatably mounted with said piston valves, and means slidably engaging said valve plate for simultaneously actuating the pistons of one clutch, a manual actuating member for controlling the piston valves of both clutches and lost motion means interposed between said manual actuating member and said clutch valves whereby said manual actuating member has a range of movement capable of opening one set of valves before closing the other set of valves.

WILLIAM IVERSON.